United States Patent
Xu et al.

(10) Patent No.: US 12,254,638 B2
(45) Date of Patent: *Mar. 18, 2025

(54) METHOD AND SYSTEM OF RECOGNIZING OBJECT EDGES AND COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 410 days.

This patent is subject to a terminal disclaimer.

(21) Appl. No.: 17/637,801

(22) PCT Filed: Aug. 30, 2021

(86) PCT No.: PCT/CN2021/115482
§ 371 (c)(1),
(2) Date: Feb. 24, 2022

(87) PCT Pub. No.: WO2022/057607
PCT Pub. Date: Mar. 24, 2022

(65) Prior Publication Data
US 2023/0267619 A1  Aug. 24, 2023

(30) Foreign Application Priority Data

Sep. 21, 2020  (CN) .................. 202010995134.7

(51) Int. Cl.
*G06T 7/13* (2017.01)
*G06V 10/44* (2022.01)
*G06V 10/74* (2022.01)

(52) U.S. Cl.
CPC ................ *G06T 7/13* (2017.01); *G06V 10/44* (2022.01); *G06V 10/761* (2022.01); *G06T 2207/20084* (2013.01); *G06T 2207/20164* (2013.01)

(58) Field of Classification Search
CPC ............ G06T 7/13; G06T 2207/20084; G06T 2207/20164; G06V 10/44; G06V 10/761
See application file for complete search history.

(56) References Cited

U.S. PATENT DOCUMENTS 7,301,564 B2 * 11/2007 Fan .......................... G06T 7/13
    348/222.1
10,115,031 B1 * 10/2018 Pashintsev ............. G06V 10/25
(Continued)

FOREIGN PATENT DOCUMENTS

| CN | 102005038 | 4/2011 |
|----|-----------|--------|
| CN | 104268864 | 1/2015 |

(Continued)

OTHER PUBLICATIONS

Wang; Wei et al., "An improved algorithm for Harris corner detection", Optics and Precision Engineering, Oct. 2008, with English abstract, pp. 1995-2001, vol. 16, No. 10.
(Continued)

*Primary Examiner* — Chan S Park
*Assistant Examiner* — Sebastian-Sy Vuchi Ngo
(74) *Attorney, Agent, or Firm* — JCIP GLOBAL INC.

(57) ABSTRACT

A method and system of recognizing object edges and a computer-readable storage medium are provided. The method includes: obtaining an input image; recognizing the input image and obtaining a relative position of each object vertex and a corresponding image vertex thereof; determining a reference position of each object vertex in the input image according to the relative position of each object
(Continued)

vertex and the corresponding image vertex thereof; performing corner point detection in a predetermined area where the reference position of the object vertex is located for each object vertex; determining an actual position of each object vertex in the input image according to a result of the corner point detection; and sequentially connecting adjacent object vertices to form edge lines to obtain the edges of the object with edges in the input image according to the actual position of each object vertex in the input image.

14 Claims, 4 Drawing Sheets

(56) References Cited

U.S. PATENT DOCUMENTS

| | | | |
|---|---|---|---|
| 11,200,734 | B2* | 12/2021 | Huang ............... H04N 23/698 |
| 2005/0123180 | A1 | 6/2005 | Luo et al. |
| 2006/0056732 | A1 | 3/2006 | Holmes |
| 2008/0205764 | A1 | 8/2008 | Iwai et al. |
| 2013/0182969 | A1 | 7/2013 | Pan et al. |
| 2013/0329134 | A1 | 12/2013 | Inamoto |
| 2016/0155011 | A1 | 6/2016 | Sulc et al. |
| 2017/0270662 | A1 | 9/2017 | Kato et al. |
| 2017/0372134 | A1* | 12/2017 | Zagaynov ............ G06V 10/507 |
| 2018/0165815 | A1 | 6/2018 | Okada et al. |
| 2021/0034856 | A1* | 2/2021 | Torres ............... G06V 30/414 |
| 2022/0335704 | A1* | 10/2022 | Xu ........................ G06N 3/08 |

FOREIGN PATENT DOCUMENTS

| | | |
|---|---|---|
| CN | 105096299 | 11/2015 |
| CN | 105654097 | 6/2016 |
| CN | 107123188 | 9/2017 |
| CN | 108627092 | 10/2018 |
| CN | 108629343 | 10/2018 |
| CN | 108764143 | 11/2018 |
| CN | 108875723 | 11/2018 |
| CN | 109118473 | 1/2019 |
| CN | 109711416 | 5/2019 |
| CN | 109859226 | 6/2019 |
| CN | 110738602 A * | 1/2020 |
| CN | 111091123 | 5/2020 |
| CN | 111401266 | 7/2020 |
| CN | 111598091 | 8/2020 |
| CN | 111680685 | 9/2020 |
| CN | 111680688 | 9/2020 |
| CN | 112132163 | 12/2020 |
| EP | 0156343 | 10/1985 |
| JP | 2016109669 | 6/2016 |
| JP | 2019124683 | 7/2019 |
| KR | 20130007950 | 1/2013 |
| KR | 102079121 | 2/2020 |

OTHER PUBLICATIONS

Xing; Xiaomin et al., "Edge Detection Method Combining Corner Points to Realize the Image Location of the Tower Sign in the Transmission Line", Jilin Electric Power, Jun. 2020, with English abstract, pp. 32-36, vol. 48, No. 3.

Otto Lappi et al., "Pursuit Eye-Movements in Curve Driving Differentiate between Future Path and Tangent Point Models", PloS one, Jul. 22, 2013, pp. 1-16, vol. 8, Issue 7.

"Office Action of China Counterpart Application", issued on Nov. 22, 2023, p. 1-p. 10.

"Notice of allowance of China Counterpart Application", issued on Feb. 29, 2024, p. 1-p. 6.

"International Search Report (Form PCT/ISA/210) of PCT/CN2021/115482," mailed on Nov. 17, 2021, pp. 1-4.

"Written Opinion of the International Searching Authority (Form PCT/ISA/237) of PCT/CN2021/115482," mailed on Nov. 17, 2021, pp. 1-5.

* cited by examiner

METHOD AND SYSTEM OF RECOGNIZING OBJECT EDGES AND COMPUTER-READABLE STORAGE MEDIUM

CROSS-REFERENCE TO RELATED APPLICATION

This application is a 371 of international application of PCT application serial no. PCT/CN2021/115482, filed on Aug. 30, 2021, which claims the priority benefit of China application no. 202010995134.7, filed on Sep. 21, 2020. The entirety of each of the above mentioned patent applications is hereby incorporated by reference herein and made a part of this specification.

TECHNICAL FIELD

The disclosure relates to the technical field of digital image processing, and in particular, relates to a method and system of recognizing object edges and a computer-readable storage medium.

DESCRIPTION OF RELATED ART

Nowadays, people frequently take pictures of objects (e.g., business cards, test paper, laboratory test sheets, documents, etc.) with an aim to perform corresponding processing on the photographed images to obtain relevant information of the objects in the images. However, a photographed image not only includes an object, but also inevitably includes the external environment where the object is located. The part of the image corresponding to the external environment is redundant for recognition of the relevant information of the object in the image. Therefore, when the image is processed to obtain the relevant information of the object in the image, the edges of the object need to be detected from the image, so that the object may be extracted from the image according to the edges of the object.

SUMMARY

The disclosure aims to provide a method and system of recognizing object edges and a computer-readable storage medium to detect edges of an object with edges in an image.

To accomplish the above, the disclosure provides a method of recognizing object edges, and the method includes the following steps.

An input image is obtained, where the input image includes an object with edges, and the edges of the object include a plurality of object vertices.

The input image is recognized through an object vertex recognition model, and a relative position of each object vertex and a corresponding image vertex thereof is obtained.

According to the relative position of each object vertex and the corresponding image vertex thereof, a reference position of each object vertex in the input image is determined.

For each object vertex, corner point detection is performed in a predetermined area where the reference position of the object vertex is located.

According to a result of the corner point detection, an actual position of each object vertex in the input image is determined.

According to the actual position of each object vertex in the input image, adjacent object vertices are sequentially connected to form edge lines to obtain the edges of the object with edges in the input image.

Optionally, in the method of recognizing object edges, the predetermined area where the reference position of the object vertex is located is a circular area with a pixel point at the reference position of the object vertex as a center of the circle and a first predetermined pixel as a radius.

The step of performing the corner point detection in the predetermined area where the reference position of the object vertex is located for each object vertex further includes the following step.

The corner point detection is performed on the pixel point in the circular area corresponding to each object vertex, all of the pixel points whose feature value variation ranges are greater than a predetermined threshold are treated as candidate corner points during a process of the corner point detection, and a target corner point corresponding to each object vertex is determined among the candidate corner points.

Optionally, in the method of recognizing object edges, the step of determining the target corner point corresponding to each object vertex among the candidate corner points further includes the following steps.

In step A1, the candidate corner points are sorted in a descending order according to the feature value variation ranges, where the candidate corner point ranked first is determined as the target corner point, and the candidate corner point ranked second is determined as a current corner point to be selected.

In step A2, it is determined whether all distances between the current corner point to be selected and all current target corner points are greater than a second predetermined pixel, where step A3 is performed if yes is determined, otherwise, step A4 is performed.

In step A3, the current corner point to be selected is determined as the target corner point.

In step A4, the current corner point to be selected is discarded, the candidate corner point ranked next is determined as the current corner point to be selected, and step A2 is performed again.

Optionally, in the method of recognizing object edges, a range of the second predetermined pixel is ≥50 pixels.

Optionally, in the method of recognizing object edges, a range of the first predetermined pixel is 10 to 20 pixels.

Optionally, in the method of recognizing object edges, the step of determining the actual position of each object vertex in the input image according to the result of the corner point detection further includes the following step.

For each object vertex, if the result of the corner point detection of the object vertex includes a corner point, a position of the corner point is determined as the actual position of the object vertex in the input image, or if the result of the corner point detection of the object vertex does not include a corner point, the reference position of the object vertex in the input image is determined as the actual position of the object vertex in the input image.

Optionally, in the method of recognizing object edges, the step of obtaining the relative position of each object vertex and the corresponding image vertex thereof further includes the following step.

For each object vertex, a relative position of the object vertex and the image vertex closest to the object vertex in the input image is obtained.

Optionally, in the method of recognizing object edges, the step of determining the reference position of each object vertex in the input image according to the relative position of each object vertex and the corresponding image vertex thereof further includes the following step.

For each object vertex, the relative position of the object vertex and the image vertex closest to the object vertex in the input image is converted into coordinates of the object vertex in a target coordinate system to obtain the reference position of the object vertex in the input image.

Optionally, in the method of recognizing object edges, an origin of the target coordinate system is a position point of the input image.

Optionally, the method of recognizing object edges further includes the following step.

The object with edges is corrected by using the edge lines.

Optionally, in the method of recognizing object edges, 4 object vertices are provided and 4 edge lines are provided, which are a first line, a second line, a third line, and a fourth line in sequence. The first line and the third line are arranged in a first direction, the second line and the fourth line are arranged in a second direction, and the first direction is perpendicular to the second direction.

Optionally, in the method of recognizing object edges, the step of correcting the object with edges by using the edge lines further includes the following steps.

Projection lengths of the first line and the third line in the second direction are obtained, separately and projection lengths of the second line and the fourth line in the first direction are obtained separately.

An average value of the projection lengths of the first line and the third line in the second direction is calculated to act as a corrected length of the object with edges in the second direction.

An average value of the projection lengths of the second line and the fourth line in the first direction is calculated to act as a corrected length of the object with edges in the first direction.

Optionally, in the method of recognizing object edges, the object vertex recognition model is a neural network model.

Based on the same inventive concept, the disclosure further provides a system of recognizing object edges. The system includes a processor and a memory, and the memory stores a command. When the command is executed by the processor, the steps of the method of recognizing object edges are implemented, and the method includes the following steps. An input image is obtained, where the input image includes an object with edges, and the edges of the object include a plurality of object vertices. The input image is recognized through an object vertex recognition model, and a relative position of each object vertex and a corresponding image vertex thereof is obtained. According to the relative position of each object vertex and the corresponding image vertex thereof, a reference position of the object vertex in the input image is determined. For each object vertex, corner point detection is performed in a predetermined area where the reference position of the object vertex is located. According to a result of the corner point detection, an actual position of each object vertex in the input image is determined. According to the actual position of each object vertex in the input image, adjacent object vertices are sequentially connected to form edge lines to obtain the edges of the object with edges in the input image.

Based on the same inventive concept, the disclosure further provides a computer-readable storage medium, and the computer-readable storage medium stores a command. When the command is executed, the steps of the method of recognizing object edges are implemented, and the method includes the following steps. An input image is obtained, where the input image includes an object with edges, and the edges of the object include a plurality of object vertices. The input image is recognized through an object vertex recognition model, and a relative position of each object vertex and a corresponding image vertex thereof is obtained. According to the relative position of each object vertex and the corresponding image vertex thereof, a reference position of the object vertex in the input image is determined. For each object vertex, corner point detection is performed in a predetermined area where the reference position of the object vertex is located. According to a result of the corner point detection, an actual position of each object vertex in the input image is determined. According to the actual position of each object vertex in the input image, adjacent object vertices are sequentially connected to form edge lines to obtain the edges of the object with edges in the input image.

Compared with the related art, the method and system of recognizing object edges and the computer-readable storage medium provided by the disclosure exhibit the following advantages. Machine learning is adopted to recognize the object vertices in the input image and the relative position of each object vertex and the corresponding image vertex thereof, and that the reference position of each object vertex in the input image may thus be further determined. Corner point detection is then performed at the reference position of each object vertex, and the actual position of each object vertex in the input image is ultimately determined according to the result of corner point detection. Finally, adjacent object vertices are sequentially connected to form the edge lines to obtain the edges of the object with edges in the input image. The machine learning method adopted in the disclosure may quickly locate the position of each object vertex in the input image, and further, the corner point detection method is also used to correct the position of each object vertex. In this way, edge detection of the object with edges in the input image is implemented, and the accuracy of edge detection is also improved.

BRIEF DESCRIPTION OF THE DRAWINGS

To make the technical solutions provided in the embodiments of the disclosure or the related art more clearly illustrated, several accompanying drawings required by the embodiments or the related art for description are briefly introduced as follows. Obviously, the drawings in the following description are merely some embodiments of the disclosure, and for a person having ordinary skill in the art, other drawings can be obtained based on these drawings without inventive effort.

DESCRIPTION OF THE EMBODIMENTS

A method and system of recognizing object edges and a computer-readable storage medium provided by the disclosure are described in detail below with reference to the accompanying drawings and specific embodiments. According to the following description, the advantages and features of the disclosure will be clearer. It should be noted that the drawings all adopt a very simplified form and all use imprecise proportions, which are only used to conveniently and clearly assist in explaining the purpose of the embodiments of the disclosure. It should be noted that the structures, ratios, sizes, etc. shown in the accompanying drawings in the specification are only to be used together with the content disclosed in the specification for a person having ordinary skill in the art to comprehend and read, are not intended to limit the limiting conditions of the implementation of the disclosure, and therefore have no technical significance. Any structural modification, proportional relationship change, or size adjustment, without affecting the effects and objectives that can be achieved by the disclosure, should still fall within the scope of the technical content disclosed in the disclosure.

Figure 1:
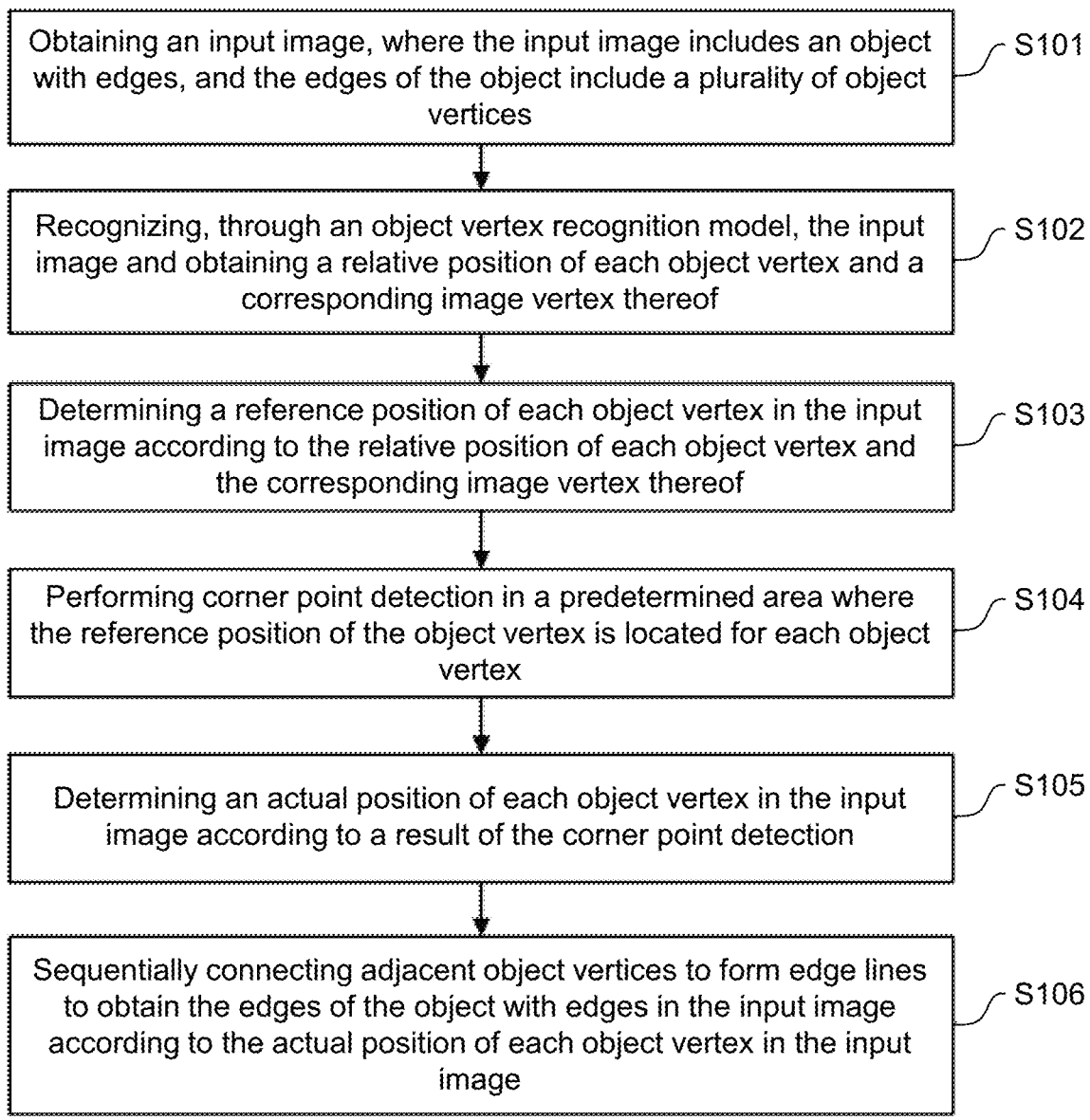
FIG. 1 is a schematic flow chart of a method for recognizing object edges according to an embodiment of the disclosure.

FIG. 1 illustrates a flow chart of a method of recognizing object edges according to an embodiment of the disclosure, and this method may be implemented in an application (app) installed on a smart terminal such as a mobile phone or a tablet computer. As shown in FIG. 1, the method includes the following steps.

In step S101, an input image is obtained, where the input image includes an object with edges, and the edges of the object includes a plurality of object vertices.

Figure 2:
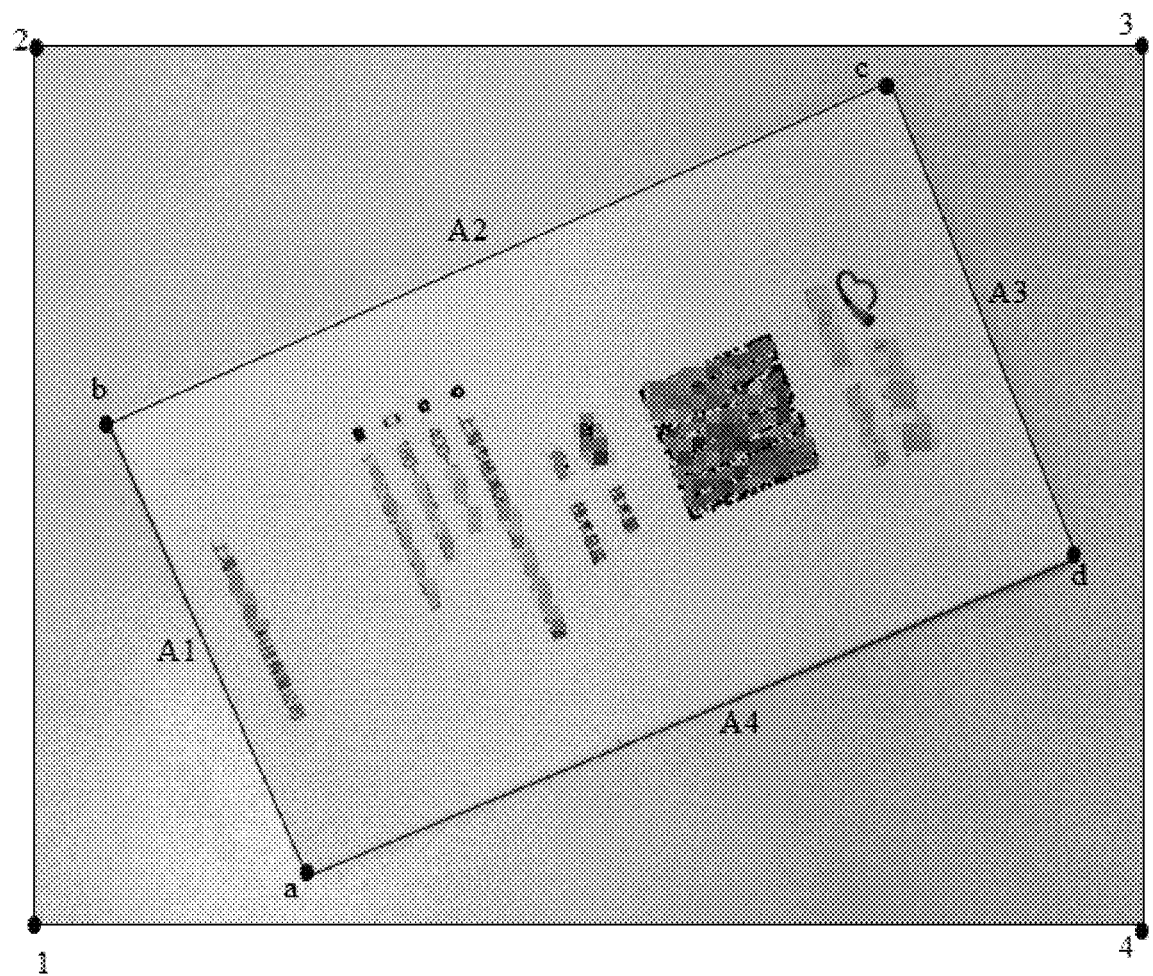
FIG. 2 is a specific example of an input image according to the disclosure.
Figure 3:
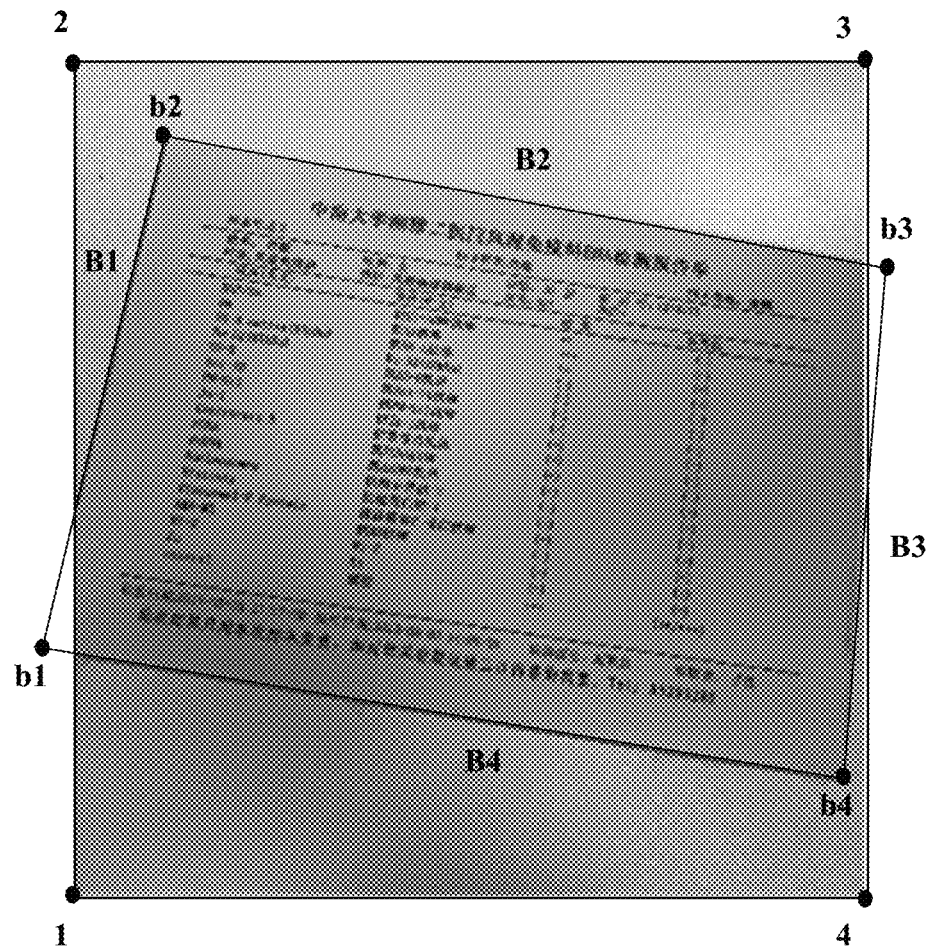
FIG. 3 is another specific example of an input image according to the disclosure.

For instance, the input image is an image obtained by a user taking a photo of an object, and the object may be, for example, a business card, a piece of test paper, a laboratory test sheet, a document, an invoice, etc. As shown in FIG. 2, in some embodiments, the input image may be an image obtained by taking a photo of a business card. As shown in FIG. 3, in some embodiments, the input image may be an image obtained by taking a photo of a laboratory test sheet.

For instance, a shape of the object in the input image may be a regular shape (e.g., a rectangle, etc.) or an irregular shape, and correspondingly, the edges of the object in the input image also have a plurality of object vertices. In the input image shown in FIG. 2, the shape of the business card is a rectangle with four edges (i.e., lines) A1 to A4. The junction of two adjacent edges among the four edges constitutes an object vertex, that is, the business card in the input image has four object vertices a to d. As shown in the input image shown in FIG. 3, the shape of the laboratory test sheet is a rectangle. However, an entire area of the laboratory test sheet is not fully captured in the input image, and therefore, the lower left vertex and the upper right vertex of the laboratory test sheet are not included in the input image. Regarding a case like this one, four edge lines B1 to B4 of the laboratory test sheet in the input image may be extended to obtain the lower left vertex and the upper right vertex of the laboratory test sheet, thereby obtaining four object vertices b1 to b4 of the laboratory test sheet.

A shape of the input image may also be an irregular shape, and the shape and size of the input image may be set by the user according to actual conditions. For instance, the input image may be an image captured by a digital camera or a mobile phone, and the input image may be a grayscale image or a color image. For instance, the input image may be an original image directly acquired by an image acquisition device or an image which is obtained after the original image is pre-processed. For instance, before the input image is processed, input image preprocessing may be further included in the operation of recognizing and processing the object edges in order to prevent edge detection of the object from being affected by data quality and data imbalance of the input image. Preprocessing may eliminate irrelevant information or noise information in the input image, so that the input image may be better processed.

In step S102, the input image is recognized through an object vertex recognition model, and a relative position of each object vertex and a corresponding image vertex thereof are obtained.

For instance, the object vertex recognition model may be implemented through the machine learning technology and may be run on a general-purpose computing apparatus or a dedicated computing apparatus, for example. The object vertex recognition model is a neural network model obtained by pre-training. For instance, the object vertex recognition model may be implemented by using a neural network such as a deep convolutional neural network (DEEP-CNN). In some embodiments, the input image is inputted to the object vertex recognition model, and the object vertex recognition model may recognize the object vertices in the input image to obtain the relative position of each object vertex and the corresponding image vertex thereof. The image vertices of the input image refer to vertices of image edges of the image. For instance, in FIG. 2, the input image is a rectangle, so there are four image vertices, 1 to 4.

The object vertex recognition model is introduced in detail below.

First, the object vertex recognition model is established through machine learning training, and the training steps of the object vertex recognition model may include the following steps.

In step a, a training sample set is obtained, and sample images in the training sample set are all labeled with the object vertices of the object in the image as well as the relative positions of the object vertices and the corresponding image vertices thereof.

In step b, a test sample set is obtained, and sample images in the test sample set are also all labeled with the object vertices of the object in the image as well as the relative positions of the object vertices and the corresponding image vertices thereof. The test sample set is different from the training sample set.

In step c, the object vertex recognition model is trained based on the training sample set.

In step d, the object vertex recognition model is tested based on the test sample set.

In step e, when a test result indicates that a recognition accuracy rate of the object vertex recognition model is less than a predetermined accuracy rate, the number of samples in the training sample set is increased for re-training.

In step f, when the test result indicates that the recognition accuracy rate of the object vertex recognition model is greater than or equal to the predetermined accuracy rate, the training is completed.

As described in the foregoing paragraphs, the object comes in various types, such as a business card, a piece of test paper, a laboratory test sheet, a document, an invoice, etc. For each object type, a specific number of sample images labeled with corresponding information are obtained, and the number of sample images prepared for each object type may be the same or different. Each sample image may contain the entire area of the object (as shown in FIG. 2) or may only contain a part of the object (as shown in FIG. 3). The sample images obtained for each object type may include images taken under different shooting angles and different lighting conditions as much as possible. In these cases, the corresponding information labeled for each sample image may also include information such as the shooting angle and illumination of the sample image.

The sample image that has undergone the abovementioned labeling processing may be divided into the training sample set used to train the object vertex recognition model and the test sample set used to test the training result. Generally, the number of samples in the training sample set is significantly greater than the number of samples in the test sample set. For instance, the number of samples in the test sample set may account for 5% to 20% of the total number of sample images, and the number of samples in the corresponding training sample set may account for 80% to 95% of the total number of sample images. A person having ordinary skill in the art should understand that the number of samples in the training sample set and the test sample set may be adjusted according to needs.

The training sample set may be used to train the object vertex recognition model, and the test sample set may be used to test the recognition accuracy rate of the trained object vertex recognition model. If the recognition accuracy rate does not satisfy a requirement, the number of sample images in the training sample set is increased and the object vertex recognition model is retrained through the updated training sample set until the recognition accuracy rate of the trained object vertex recognition model satisfy the requirement. If the recognition accuracy rate satisfies the requirement, the training ends. In an embodiment, it can be determined whether the training may end based on whether the recognition accuracy rate is less than the predetermined accuracy rate. In this way, the trained object vertex recognition model whose output accuracy rate meets the requirement may be used to recognize the object vertices in the input image.

It should be noted that if the image shown in FIG. 3 is used as the sample image, when labeling is performed, the object vertices b2 and b4 may be labeled, and adjacent edge lines may also be extended to obtain the object vertices b1 and b3 outside the sample image. The object vertices b1 and b3 are also labeled, and the relative positions of the object vertices b1 to b4 and the corresponding image vertices thereof are also labeled.

In this way, if the sample image which is labeled in accordance with the abovementioned labeling manner is used to train the object vertex recognition model, when recognizing the input image similar to that in FIG. 3, the object vertex recognition model may not only recognize the object vertices located in the input image but also the object vertices located outside the input image, as well as the relative position of each object vertex and the corresponding image vertex thereof. It should be noted that when labeling the sample image, the object vertices located outside the image are obtained by extending adjacent edge lines. However, the object vertex recognition model after training does not need to extend the edge lines to obtain the object vertices outside the image when recognizing the input image, but may directly obtain the coordinates of the external object vertices and corresponding image vertices thereof.

Preferably, among the training steps of the object vertex recognition model, in step a, when the relative position of each object vertex of the object in the sample image and the corresponding image vertex thereof is labeled, it is preferable to label the relative position of each object vertex and the image vertex closest to this object vertex. Taking the image shown in FIG. 2 as a sample image as an example, the distance between the object vertex a and the image vertex 1 is the closest. Therefore, the relative position of the object vertex a and the image vertex 1 is labeled, that is, for the object vertex a, the coordinates of the object vertex a are converted into the coordinates with the image vertex 1 as the origin. In the same way, for the object vertex b, the coordinates of the object vertex b are converted into the coordinates with the image vertex 2 as the origin. For the object vertex c, the coordinates of the object vertex c are converted into the coordinates with the image vertex 3 as the origin. For the object vertex d, the coordinates of the object vertex d are converted into the coordinates with the image vertex 4 as the origin.

In this way, if the sample image which is labeled in accordance with the abovementioned labeling manner is used to train the object vertex recognition model, the recognition result of the object vertex recognition model is to recognize the relative position of each object vertex in the input image with respect to the image vertex closest to the object vertex in the input image. Taking the image shown in FIG. 2 as an input image as an example, after recognition is performed through the object vertex recognition model, the relative position of the object vertex a with respect to the image vertex 1 (that is, the coordinates of the object vertex a when the image vertex 1 is the origin), the relative position of the object vertex b with respect to the image vertex 2 (that is, the coordinates of the object vertex b when the image vertex 2 is the origin), the relative position of the object vertex c with respect to the image vertex 3 (that is, the coordinates of the object vertex c when the image vertex 3 is the origin), and the relative position of the object vertex d with respect to the image vertex 4 (that is, the coordinates of the object vertex d when the image vertex 4 is the origin) may be obtained.

In step S103, according to the relative position of each object vertex and the corresponding image vertex thereof, a reference position of each object vertex in the input image is determined.

For instance, the relative position of each object vertex and the image vertex closest to the object vertex in the input image is converted into reference coordinates of the object vertex in a target coordinate system to obtain the reference position of each object vertex in the input image. Preferably, the origin of the target coordinate system is a position point in the input image.

Taking the input image shown in FIG. 2 as an example, in step S102, the coordinates of the object vertex a when the image vertex 1 is the origin are obtained, the coordinates of the object vertex b when the image vertex 2 is the origin are obtained, the coordinates of the object vertex c when the image vertex 3 is the origin are obtained, and the coordinates of the object vertex d when the image vertex 4 is the origin are obtained. Since the coordinates of object vertices obtained herein are not coordinates in the same coordinate system, the coordinates of the object vertices are thus required to be converted and are required to be converted into the coordinates in the same coordinate system. To be specific, in step S103, the coordinates of the aforementioned four object vertices may be converted into coordinates treating the same position point as the origin of the same coordinate system, and in this way, the reference position of each object vertex in the input image may be conveniently determined.

Since the same position point is a specific position in the input image, the relative coordinates of each image vertex of the input image and the position point are known, and the relative coordinates of each object vertex when the position point is treated as the origin of the coordinate system may be obtained.

For instance, the origin of the target coordinate system may be a center point of the input image. Preferably, the origin of the target coordinate system is a specific image vertex of the input image. Taking the image shown in FIG. 2 as an input image as an example, the origin of the target coordinate system may be the image vertex 1. Therefore, when the image vertex 1 is treated as the origin of the coordinate system, the coordinate values of the object vertices a, b, c, and d are obtained, so that the reference positions of the object vertices a, b, c, and d in the input image are also known.

In step S104, for each object vertex, corner point detection is performed in a predetermined area where the reference position of the object vertex is located.

Generally, a corner point is an extreme point, that is, a point with a specific attribute that is particularly prominent. It is an isolated point or an end point of a line segment with the greatest or least strength in specific attributes. A corner point is usually defined as the intersection of two edges. In other words, the local neighborhood of the corner point should have a boundary of two different areas in different directions. Strictly speaking, the local neighborhood of a corner point should have a boundary of two different areas in different directions. In practical applications, most of the so-called corner point detection methods detect image points with specific features, not just the "corner points". These feature points have specific coordinates in the image and have certain mathematical features, such as local maximum or minimum gray levels, certain gradient features, etc.

In the basic idea of the corner point detection algorithm, a fixed window (a neighborhood window of a specific pixel) is used to slide in any direction on the image, and the two cases before and after the sliding are compared. Regarding the degree of grayscale change of the pixels in the window, if there is sliding in any direction and there is a large grayscale change, then it can be considered that there are corner points in the window.

Generally, any object vertex of the object with edges corresponds to one corner point in the input image. By performing corner point detection in the predetermined area where the reference position of each object vertex is located, the corner point corresponding to each object vertex is detected.

The predetermined area where the reference position of the object vertex is located is a circular area with a pixel point at the reference position of the object vertex as a center of the circle and a first predetermined pixel as a radius, and a range of the first predetermined pixel is, for example, 10 to 20 pixels, preferably 15 pixels.

To be specific, the corner point detection is performed on the pixel point in the circular area corresponding to each object vertex, all of the pixel points whose feature value variation ranges are greater than a predetermined threshold are treated as candidate corner points during a process of the corner point detection, and a target corner point corresponding to each object vertex among the candidate corner points is determined.

Herein, the feature value variation range refers to the degree of pixel grayscale variation in the fixed window used for corner point detection. It can be understood that when the feature value variation range decreases, the possibility that the pixel point is a corner point decreases. By comparing the feature value variation range with a predetermined threshold, the pixels that are less likely to be corner points may be eliminated, and the pixels that are more likely to be corner points are retained as candidate corner points, which facilitates further determination of the target corner point among the candidate corner points. Specific corner point detection algorithms include, for example, a grayscale image-based corner point detection algorithm, a binary image-based corner point detection algorithm, a contour curve-based corner point detection algorithm, and so on. For details, please refer to the related art, and description thereof is not repeated herein.

To be specific, the step of determining the target corner point corresponding to each object vertex among the candidate corner points further includes the following steps.

In step A1, the candidate corner points are sorted in a descending order according to the feature value variation ranges, where the candidate corner point ranked first is determined as the target corner point, and the candidate corner point ranked second is determined as a current corner point to be selected.

In step A2, it is determined whether all distances between the current corner point to be selected and all current target corner points are greater than a second predetermined pixel, where step A3 is performed if yes is determined, otherwise, step A4 is performed.

In step A3, the current corner point to be selected is determined as the target corner point.

In step A4, the current corner point to be selected is discarded, the candidate corner point ranked next is determined as the current corner point to be selected, and step A2 is performed again.

It may be understood that if sorting is performed in the descending order according to the feature value variation range, the feature value variation range of the candidate corner point ranked first is the largest. Therefore, this candidate corner point is most likely to be the corner point and thus be directly determined as the target corner point. For the candidate corner point ranked second, this candidate corner point may be located in the circular area of the same object vertex (assumed to be the object vertex 1) with the candidate corner point ranked first, or this candidate corner point may be located in the circular area of another object vertex (assumed to be the object vertex 2). Regarding the first case, since the candidate corner point ranked first is determined as the target vertex of the object vertex 1, it is impossible to determine the candidate corner point ranked second as the target vertex of the object vertex 1 as well. Regarding the second case, the candidate corner point ranked second must be the pixel point which is most likely to be the corner point in the circular area of the object vertex 2, so that the candidate corner point ranked second is required to be determined as the target vertex of the object vertex 2. Based on the above, in this embodiment, by determining whether the distance between the candidate corner point ranked second and the target corner point is greater than the second predetermined pixel, it is determined which of the above-mentioned cases the candidate corner point ranked second belongs to. If the distance between the candidate corner point ranked second and the target corner point is greater than the second predetermined threshold, it means that the candidate corner point ranked second belongs to the second case, otherwise, it means that the candidate corner point ranked second belongs to the first case. If it belongs to the second case, it is necessary to determine the candidate corner point ranked second as the target corner point, and if it belongs to the first case, it is necessary to discard the candidate corner point ranked second. By analogy, each candidate corner point is determined according to the above logic, so that multiple target corner points may be ultimately determined among the candidate corner points.

Through the above processing, it can be ensured that there is at most one candidate corner point remaining around each object vertex, and the position of the remaining candidate corner point is the actual position of the object vertex.

Preferably, the range of the second predetermined pixel may be set to ≥50 pixels, and the upper limit value may be set according to the specific size of the image, which is not limited herein.

It should be noted that, in the process of corner point detection of an object vertex, there may be cases where the corner point cannot be detected. For instance, the change between the predetermined area of the object vertex and an image background is excessively small that no corner point can be detected, or the object vertex is outside the image (e.g., the object vertices b1 and b3 in FIG. 3) and there is no corner point at all. In the case where no corner point can be detected, the object vertex may also be regarded as a corner point.

In step S105, an actual position of each object vertex in the input image is determined according to a result of the corner point detection.

To be specific, the object vertices with the remaining corner points around are replaced with the corresponding corner points as the actual vertices of the object.

That is, for each object vertex, if the result of the corner point detection of the object vertex includes a corner point, a position of the corner point is determined as the actual position of the object vertex in the input image, or if the result of the corner point detection of the object vertex does not include a corner point, the reference position of the object vertex in the input image is determined as the actual position of the object vertex in the input image.

Through the above processing, the actual position of the object vertex in the input image may be corrected according to the coordinates of the detected corner point, so that accuracy of position detection of the object vertex is improved.

It can be understood that the reference position of the object vertex in the input image obtained in step S103 is actually a relatively rough position. Corner point detection is further performed based on this rough position in step S104, and the position of the object vertex is re-determined according to the result of the corner point detection in step S105, so that an accurate position of the object vertex may be obtained.

In step S106, adjacent object vertices are sequentially connected to form the edge lines to obtain the edges of the object with edges in the input image according to the actual position of each object vertex in the input image.

In the input image shown in FIG. 2, the actual positions of the four object vertices a, b, c, and d in the input image may be obtained from step S103. Therefore, the edge lines may be obtained by sequentially connecting the adjacent object vertices, that is, the edge line A1 may be obtained by connecting a and b, the edge line A2 may be obtained by connecting b and c, the edge line A3 may be obtained by connecting c and d, and the edge line A4 may be obtained by connecting d and a. These four edge lines constitute the edges of the business card in the input image.

After the edges of the object with edges in the input image are determined, the inner area defined by the edges is the area where the object is located. Therefore, the area where the object is located may be cropped to remove the background area irrelevant to the object in the input image, and a sliced image of the object is obtained. Certainly, in other embodiments, slicing may not be performed, but the area where the object is located is labeled in the form of a labeling frame instead.

Further, in practical applications, since the real shape of the object in the image obtained photo taking is changed in the image, geometric distortion occurs. As shown in the image shown in FIG. 3, the shape of the laboratory test sheet is originally rectangular, but the shape of the laboratory test sheet in the image is changed and becomes a parallelogram. Therefore, it is necessary to correct the object in the input image, so that the corrected object may be easily viewed to facilitate subsequent processing. For instance, OCR may be performed to identify the characters in the object.

To be specific, the edge lines may be used to correct the object in the input image.

In an embodiment, the object with edges is a rectangle, but the object in the input image is not a rectangle. It can be understood that in the input image, four object vertices may be provided and four edge lines are provided, which are a first line, a second line, a third line, and a fourth line in sequence. The first line and the third line are arranged in a first direction, the second line and the fourth line are arranged in a second direction, and the first direction is perpendicular to the second direction.

The step of correcting the object with edges by using the edge lines further includes the following steps.

Projection lengths of the first line and the third line in the second direction are obtained separately, and projection lengths of the second line and the fourth line in the first direction are obtained separately.

An average value of the projection lengths of the first line and the third line in the second direction is calculated to act as a corrected length of the object with edges in the second direction.

An average value of the projection lengths of the second line and the fourth line in the first direction is calculated to act as a corrected length of the object with edges in the first direction.

Through the foregoing correction, the length of the object with edges in the input image in two directions perpendicular to each other may be obtained, so that the shape of the object in the input image may be corrected from a non-rectangular shape to a rectangular shape.

Figure 4:
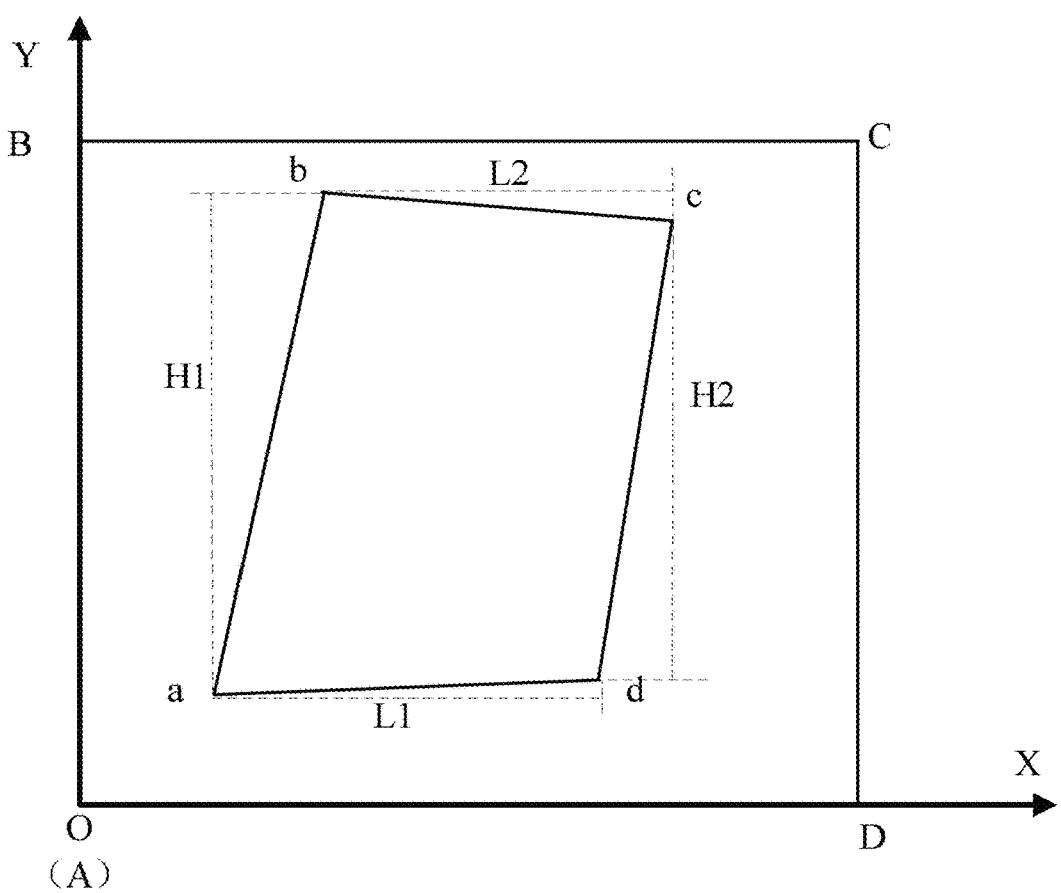
FIG. 4 is a schematic diagram of correcting an object in the input image.

For instance, in the coordinate system shown in FIG. 4, A, B, C, and D are the four image vertices of the input image, and the image vertex A is the origin of the coordinate system. The object in the input image has four object vertices, namely a, b, c, and d, and the four edge lines are a first line ab, a second line bc, a third line cd, and a fourth line da. The first line ab and the third line cd are arranged in the first direction (that is, the X-axis direction), and the second line bc and the fourth line da are arranged in the second direction (that is, the Y-axis direction).

The coordinates of each object vertex in the coordinate system may be known through the foregoing steps, and an X-axis coordinate difference between the object vertices a and d and an X-axis coordinate difference between the object vertices b and c may then be calculated, and two pieces of width data L1 and L2 are thereby obtained. The corrected width of the object may be determined based on the average value of the two pieces of width data, that is, the corrected width of the object is $L=\frac{1}{2}(L1+L2)$.

A Y-axis coordinate difference between the object vertices a and b and a Y-axis coordinate difference between the object vertices c and d may also be calculated to obtain two pieces of height data H1 and H2. The corrected height of the object may be determined based on the average value of the two pieces of height data, that is, the corrected height of the object is $H=\frac{1}{2}(H1+H2)$.

After the width and height of the corrected object are obtained, interpolation processing may be performed to adjust all the pixels in the area where the object is located in the input image to the correct positions in the corrected object. Specific implementation may be obtained with reference to the related art, which is not repeated herein.

In summary, in the method of recognizing object edges, machine learning is adopted to recognize the object vertices in the input image and the relative position of each object vertex and the corresponding image vertex thereof, and that the reference position of each object vertex in the input image may thus be further determined. Corner point detection is then performed at the reference position of each object vertex, and the actual position of each object vertex in the input image is ultimately determined according to the result of corner point detection. Finally, adjacent object vertices are sequentially connected to form the edge lines to obtain the edges of the object with edges in the input image. The machine learning method adopted in the disclosure may quickly locate the position of each object vertex in the input image, and further, the corner point detection method is also used to correct the position of the object vertex. In this way, edge detection of the object with edges in the input image is implemented, and the accuracy of edge detection is also improved.

Note that in the disclosure, the object vertex recognition model is used first to recognize each object vertex and the relative position of each object vertex with respect to the image vertex closest to the object vertex in the input image. The obtained relative position is then transformed to determine the reference position of each object vertex in the input image. Through such a processing method, the recognized relative position of each object vertex is accurate, so the obtained reference position of each object vertex is accurate, and that the accuracy of edge detection is effectively improved.

Figure 5:
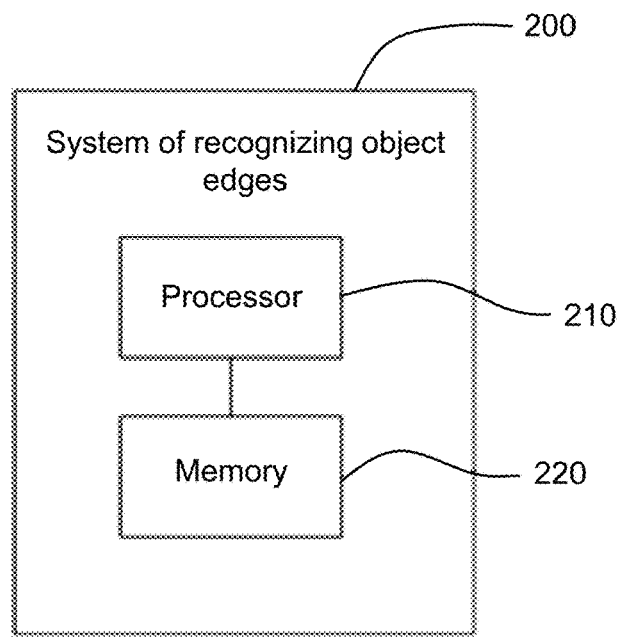
FIG. 5 is a schematic view of a structure of a system of recognizing object edges according to an embodiment of the disclosure.

Based on the same inventive concept, the disclosure further provides a system of recognizing object edges. As shown in FIG. 5, a system of recognizing object edges 200 may include a processor 210 and a memory 220. The memory 220 stores a command, and the steps of the above-mentioned method of recognizing object edges are implemented when the command is executed by the processor 210.

Herein, the processor 210 may perform various actions and processing according to commands stored in the memory 220. To be specific, the processor 210 may be an integrated circuit chip with signal processing capabilities. The processor may be a general-purpose processor, a digital signal processor (DSP), an application specific integrated circuit (ASIC), a field programmable gate array (FPGA), or other components such as a programmable logic device, a discrete gate, a transistor logic device, and a discrete hardware component. The processor may implement or execute various methods, steps, and logical block diagrams disclosed in the embodiments of the disclosure. The general-purpose processor may be a microprocessor, or the processor may be any conventional processor, etc., and may be an X86 architecture or an ARM architecture.

The memory 220 stores an executable command, which is executed by the processor 210 in method of recognizing object edges described above. The memory 220 may be a volatile memory or a non-volatile memory and may also include both the volatile memory and non-volatile memory. The non-volatile memory may be a ready-only memory (ROM), a programmable ROM (PROM), an erasable PROM (EPROM), an electrically EPROM (EEPROM), or a flash memory. The volatile memory may be a random access memory (RAM) used as an external cache. By way of exemplary but not restrictive description, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

It should be noted that the memory of the method described herein is intended to include but not limited to these and any other suitable types of memories.

Based on the same inventive concept, the disclosure also provides a computer-readable storage medium, and the computer-readable storage medium stores a command. When the command is executed, the steps in the method of recognizing object edges described above may be implemented.

Similarly, the computer-readable storage medium in the embodiments of the disclosure may be a volatile memory or a non-volatile memory or may include both the volatile memory and the non-volatile memory. It should be noted that the computer-readable storage medium as described herein is intended to include but not limited to these and any other suitable types of memories.

Note that the flow charts and block diagrams in the accompanying drawings show the possible implementation architecture, functions, and operations of the system, method, and computer program product according to the various embodiments of the disclosure. In this regard, each block in the flow charts or block diagrams may represent a module, a program segment, or a part of a code, and the module, the program segment, or the part of the code contains one or more executable commands for implementing the specified logic function. It should also be noted that in some alternative implementations, the functions marked in the blocks may also occur in a different order than the order marked in the drawings. For instance, two consecutive blocks may actually be executed substantially in parallel, or they may sometimes be executed in a reverse order, depending on the functions involved. It should also be noted that each block in the block diagrams and/or flow charts and the combination of the blocks in the block diagrams and/or flow charts may be implemented by a dedicated hardware-based system that performs specified functions or actions, or may be implemented by a combination of dedicated hardware and computer instructions.

Generally, the various exemplary embodiments of the disclosure may be implemented in hardware or dedicated circuits, software, firmware, logic, or any combination thereof. In some aspects, the embodiments may be implemented in hardware, while in other aspects, the embodiments may be implemented in firmware or software that can be executed by a controller, microprocessor, or other computing device. When various aspects of the embodiments of the disclosure are illustrated or described as block diagrams, flow charts, or using some other graphical representation, it may be understood that the blocks, devices, systems, technique, or method described herein may be implemented as non-limiting examples in hardware, software, firmware, dedicated circuits, logic, general-purpose hardware, controllers, other computing devices, or some combinations thereof.

It should be noted that the various embodiments in this specification are described in a related manner, and the same or similar parts between the various embodiments may be referred to each other. Each embodiment focuses on the differences from other embodiments. In particular, as for the system and the computer-readable storage medium, since they are basically similar to that provided in the method embodiments, description thereof is simple. For the related part, please refer to the description of the method embodiments.

In the specification, relational terms such as first and second are only used to indicate the distinction between an entity or operation and another entity or operation, and do not necessarily require or imply any such actual relationship or order between these entities or operations. Moreover, the terms "including", "comprising", or any other variations thereof are intended to cover non-exclusive inclusion, so that a process, method, object, or device including a series of elements includes not only those elements, but also other elements that are not explicitly listed, or includes elements inherent to the process, method, object, or device. If there are no more restrictions, the element defined by the sentence "including a . . . " does not exclude the existence of other identical elements in the process, method, article, or device that includes the element.

The foregoing description is only a description of the preferred embodiments of the disclosure, and does not limit the scope of the disclosure in any way. Any changes or modifications made by a person having ordinary skill in the art of the disclosure based on the foregoing disclosure shall fall within the protection scope of the claims.

What is claimed is:

1. A method of recognizing object edges, comprising:
    obtaining an input image, wherein the input image comprises an object with edges, and the edges of the object comprise a plurality of object vertices, wherein the plurality of object vertices comprise a first object vertex and a second object vertex;
    recognizing, through an object vertex recognition model, the input image and obtaining a first relative position between the first object vertex and a first image vertex, and obtaining a second relative position between the second object vertex and a second image vertex;
    determining a reference position of each of the object vertices in the input image according to the relative position of each of the object vertices and the corresponding image vertex thereof;
    performing a corner point detection in a predetermined area where the reference position of the object vertex is located for each of the object vertices;
    determining an actual position of each of the object vertices in the input image according to a result of the corner point detection; and
    sequentially connecting adjacent object vertices to form edge lines to obtain the edges of the object with edges in the input image according to the actual position of each of the object vertices in the input image.

2. The method of recognizing object edges according to claim 1, wherein the predetermined area where the reference position of the object vertex is located is a circular area with a pixel point at the reference position of the object vertex as a center of the circle and a first predetermined pixel as a radius, and
    the step of performing the corner point detection in the predetermined area where the reference position of the object vertex is located for each of the object vertices further comprises:
        performing the corner point detection on the pixel point in the circular area corresponding to each of the object vertices; treating all of the pixel points whose feature value variation ranges are greater than a predetermined threshold as candidate corner points during a process of the corner point detection; and
        determining a target corner point corresponding to each of the object vertices among the candidate corner points.

3. The method of recognizing object edges according to claim 2, wherein the step of determining the target corner point corresponding to each of the object vertices among the candidate corner points further comprises:
    step A1, sorting the candidate corner points in a descending order according to the feature value variation ranges, wherein the candidate corner point ranked first is determined as the target corner point, and the candidate corner point ranked second is determined as a current corner point to be selected;
    step A2, determining whether all distances between the current corner point to be selected and all current target corner points are greater than a second predetermined pixel, wherein step A3 is performed if all distances between the current corner point to be selected and all current target corner points are greater than the second predetermined pixel is determined, otherwise, step A4 is performed;
    step A3, determining the current corner point to be selected as the target corner point; and
    step A4, discarding the current corner point to be selected, determining the candidate corner point ranked next as the current corner point to be selected, and performing step A2 again.

4. The method of recognizing object edges according to claim 3, wherein a range of the second predetermined pixel is ≥50 pixels.

5. The method of recognizing object edges according to claim 2, wherein a range of the first predetermined pixel is 10 to 20 pixels.

6. The method of recognizing object edges according to claim 2, wherein the step of determining the actual position of each of the object vertices in the input image according to the result of the corner point detection further comprises:
    for each of the object vertices, if the result of the corner point detection of the object vertex comprises a corner point, determining a position of the corner point as the actual position of the object vertex in the input image; or if the result of the corner point detection of the object vertex does not comprise a corner point, determining the reference position of the object vertex in the input image as the actual position of the object vertex in the input image.

7. The method of recognizing object edges according to claim 1, wherein the step of obtaining the first relative position between the first object vertex and a first image vertex, and obtaining a second relative position between the second object vertex and a second image vertex further comprises:
    obtaining the first relative position between the first object vertex and the first image vertex closest to the first object vertex in the input image.

8. The method of recognizing object edges according to claim 7, wherein the step of determining the reference position of each of the object vertices in the input image according to the relative position of each of the object vertices and the corresponding image vertex thereof further comprises:
    converting the first relative position of the first object vertex and the first image vertex closest to the first object vertex in the input image into coordinates of the first object vertex in a target coordinate system to obtain the reference position of the first object vertex in the input image for each of the object vertices.

9. The method of recognizing object edges according to claim 8, wherein an origin of the target coordinate system is a position point of the input image.

10. The method of recognizing object edges according to claim 1, further comprising:
correcting the object with edges by using the edge lines.

11. The method of recognizing object edges according to claim 10, wherein four object vertices are provided and four edge lines are provided, which are a first line, a second line, a third line, and a fourth line in sequence, the first line and the third line are arranged in a first direction, the second line and the fourth line are arranged in a second direction, and the first direction is perpendicular to the second direction,
the step of correcting the object with edges by using the edge lines further comprises:
obtaining projection lengths of the first line and the third line in the second direction separately and obtaining projection lengths of the second line and the fourth line in the first direction separately;
calculating an average value of the projection lengths of the first line and the third line in the second direction to act as a corrected length of the object with edges in the second direction; and
calculating an average value of the projection lengths of the second line and the fourth line in the first direction to act as a corrected length of the object with edges in the first direction.

12. The method of recognizing object edges according to claim 1, wherein the object vertex recognition model is a neural network model.

13. A system of recognizing object edges, comprising a processor and a memory, wherein the memory stores a command, and the steps of the method according to claim 1 are implemented when the command is executed by the processor.

14. A non-transitory computer-readable storage medium, wherein the non-transitory computer-readable storage medium stores a command, and the steps of the method according to claim 1 are implemented when the command is executed.

* * * * *